July 4, 1939.  L. GEROSA ET AL  2,164,740
TRANSPORTING AND DUMPING VEHICLE
Filed July 27, 1938
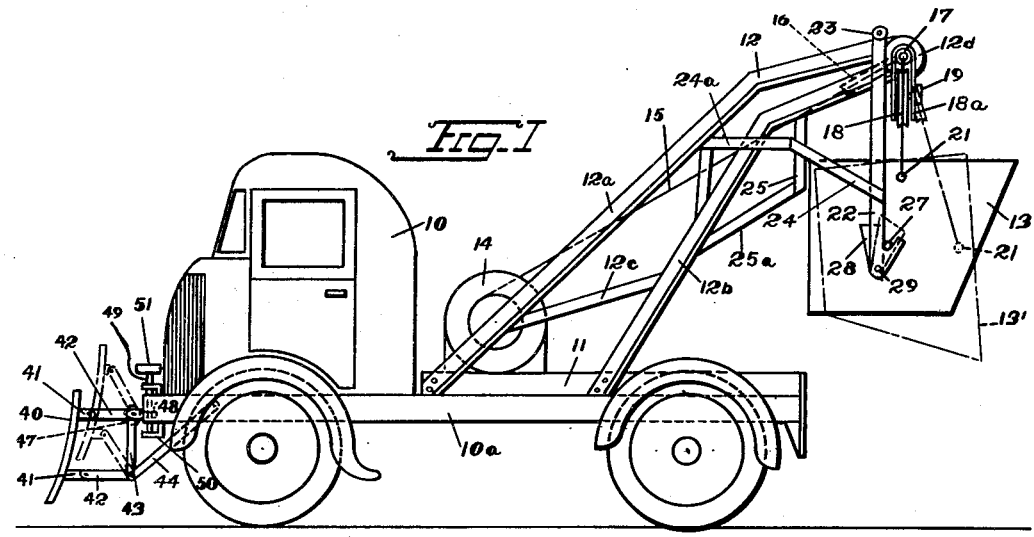
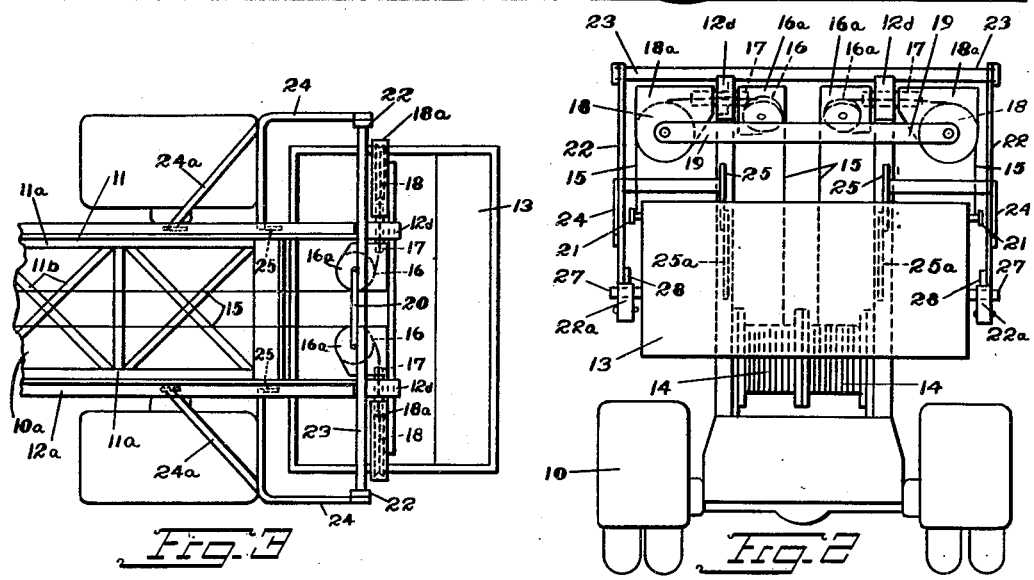
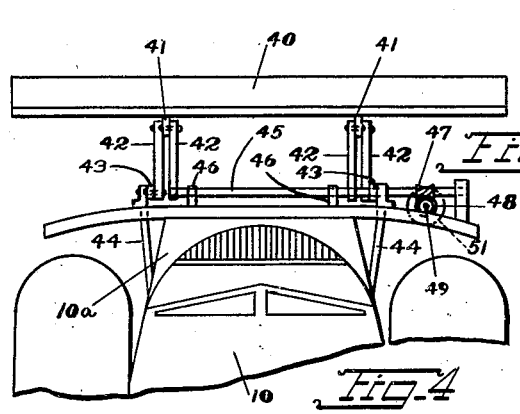
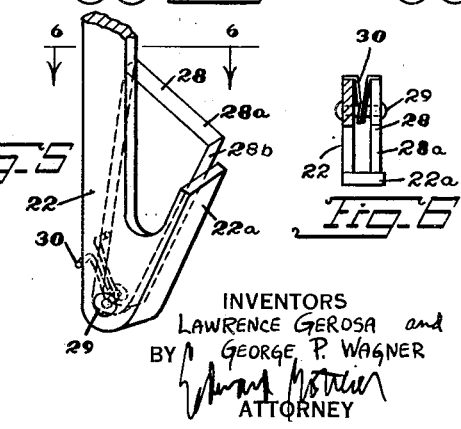
INVENTORS
LAWRENCE GEROSA and
BY GEORGE P. WAGNER
ATTORNEY Patented July 4, 1939

2,164,740

UNITED STATES PATENT OFFICE 2,164,740

TRANSPORTING AND DUMPING VEHICLE

Lawrence Gerosa and George P. Wagner, Bronx, N. Y., assignors to Speed-Dump, Inc., New York, N. Y., a corporation of New York Application July 27, 1938, Serial No. 221,512

4 Claims. (Cl. 214—116)

This invention relates to new and useful improvements in a transporting and dumping vehicle.

The invention has for an object the construction of a vehicle as mentioned which is characterized by a frame mounted upon a motor vehicle chassis and having a top rearward projecting arm, and mechanism for supporting a skip therefrom, and an arrangement for dumping the skip in a novel manner.

The invention contemplates the use of cable means for supporting the skip so that it may be raised and lowered as required, and coactable stationary hooks with movable cam members thereon arranged in a manner to control the supporting of the skip or the pivoting of the skip, making use of the hooks as fulcrums.

More specifically, the invention proposes to attach the cable supporting means on the sides of the skip at the top in a vertical plane coinciding with the center of gravity of the skip so that the skip may be conveniently hoisted without tendencies to spill. The invention proposes the provision of a pair of pegs mounted on the skip set slightly forward and downwards of the center of gravity to form a convenient fulcrum for dumping the skip in conjunction with the hooks and cams previously mentioned.

More specifically, the invention proposes to so arrange the stationary hooks that the pegs may engage therein and then the hooks function to assist in supporting the skip. It is proposed to so arrange the cams that, at will, the pegs may be engaged in the hooks or disengaged and lowered beneath the hooks by merely controlling the cable means to lift and lower the skip.

Furthermore, the invention proposes the use of a stationary front stop against which the skip may rest to assist in supporting it in the elevated position.

Further, the provision of side stops are also proposed to prevent the skip swinging laterally of the motor vehicle during transit.

Still further the invention proposes the association of a plow with the front of the motor vehicle and adapted to work to shift and move materials in the front of the vehicle under the combined inertia and momentum of the motor vehicle and skip.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevation view of a transporting and dumping vehicle constructed according to this invention.

Fig. 2 is a rear elevational view of the device shown in Fig. 1.

Fig. 3 is a fragmentary plan view of the rear portion of Fig. 1.

Fig. 4 is a fragmentary plan view of the front portion of Fig. 1.

Fig. 5 is a fragmentary perspective view of one of the hooks and cams used in the device.

Fig. 6 is a horizontal sectional view taken on the line 6—6 of Fig. 5.

The transporting and dumping vehicle, according to this invention, includes a motor driven vehicle 10 having a chassis 10a. A frame 11 is mounted on the chassis 10a and has a top rearwardly projecting arm 12. The frame 11 is formed from side arms 11a and brace arms 11b. The rearward projecting arm 12 is formed from several rearward projecting arm bodies 12a, 12b mounted on the fame 11 and reinforced with braces 12c. A skip 13 for holding earth and other heavy materials is adapted to be supported from the rear end of the projecting arm 12 so as to be slightly rearwards of the rear wheels of the motor driven vehicle 10.

Cable means are guided over the arm 12 and attached to the sides of the skip 13 near the top thereof to support the skip so that it may be hoisted and lowered. This cable means includes a hoisting winch 14 or other similar device mounted on the frame 11 and having a pair of rearwardly extending cables 15. These cables pass over hoisting pulleys 16 which are supported upon the adjacent faces of the arm bodies 12b and which connect with small tubular members 17 passing through a head member 12d fixed upon the rear extremity of the arm 12. The cables 15 pass through these tubular members 17 and continue over a pair of pulleys 18 which are pivotally supported upon the outer extremities of the tubular members 17. Normally, the pulleys 18 are in the vertical position shown by the full lines in Fig. 1, but because of the pivotal mounting they are capable of swinging laterally as for example, indicated by the dot and dash lines in Fig. 1. A bar 19 is used to rigidly brace the hoisting pulleys 18 so that they move as a unit. A bar 20 is used for bracing the hoisting pulleys 16. The cables 15, after passing over the pulleys 18, extend downwards and are connected with pins 21 or other fastening elements mounted upon the sides of the skip. These fastening elements are arranged in a vertical plane passing through the center of gravity of the skip so that the skip may be conveniently hoisted and lowered without tilting, when required.

The pulleys 16 are rotatively supported in casings 16a. It is these casings which are attached to the tubular members 17. The pulleys 18 are rotatively supported in casings 18a. These casings 18 are swivelly mounted on the tubular members 17.

A novel means is provided for assisting in holding the skip 13 in a raised position and for assisting in dumping the skip when required. This means includes a pair of stationary hooks 22. These hooks are supported at their upper ends on a bar 23 which is fixedly mounted across the top of the rearward projecting arm 12. Several braces 24 are connected with the bodies of the hooks 22 intermediate of their ends and extend rearward and are rigidly attached to stationary bars 25 fixedly mounted on the arm body 12b. The bars 25 also act as a stop against which the front face of the skip, that is, the extreme top thereof, may engage to assist in holding the skip in a stationary position without swinging. The braces 24 are reinforced with auxiliary braces 24a which connect with the sides of the rearward projecting arm 12. The stationary bars 25 are braced with members 25a also connected with the rearward projecting arm 12.

The hooks 22 are adapted to receive pegs 27 mounted upon the sides of the skip 13 slightly forwards and downwards of the center of gravity of the skip. These pegs 27, when rested on the hooks 22, form a trunnion about which the skip 13 may pivot when the cables 15 are slackened. The dot and dash lines 13' in Fig. 1 indicate a position in which the skip 13 has pivoted about the trunnion just mentioned for spilling the contents of the skip.

Each hook 22 is provided with a movably mounted cam 28 which operates to permit the pegs 27 to engage upon the hooks 22 and to disengage from these hooks when required merely by raising and lowering the skip 13, in a certain manner. Each cam 28 has an inclined top edge 28a which is adapted to extend across the mouth of the hook to guide the peg 27 away from the mouth. Each cam 28 is pivotally supported at its bottom end by a pintle 29. A spring 30 is coaxially arranged on the pintle 29 and acts to urge the cam 28 rearwards against a flange 22a formed along a portion of the hook 22. The inclined surface 28a of each cam connects with a small vertically extending surface 28b arranged immediately above the short end of the hook. The flanges 22a are arranged at an inclination to guide the pegs 27 over the top edge of the hook while the skip is being moved upwards.

The operation of the cams 28 in relation to the skip 13 is as follows: When the skip is first being hoisted, the pegs 27 will strike the inclined flanges 22a. Then the pegs 27 will work along these flanges so that the skip 13 is being moved slightly rearwards as it is being raised. When the pegs 27 move slightly above the short ends of the hooks 22 the skip 13 will swing frontwards so that the pegs 27 will strike the surfaces 28b of the cams 28. This will pivot the cams 28 to the full line positions shown in Fig. 1. The pegs 27 will then be resting against the arms of the hooks 22 and the skip 13 may then be slightly lowered to engage the pegs into the hooks.

The vehicle may be driven in this fashion, and when required, the skip 13 may be dumped merely by letting out the cables 15. To disengage the pegs 27 from the hooks 22 it is merely necessary to slightly hoist upwards the skip 13. When the pegs 27 reach a position above the cams 28 the springs 30 will pivot the cams rearwards to the positions shown by the full lines in Fig. 5, and the dot and dash lines in Fig. 1. Then when the skip is lowered the pegs 27 will move along the inclined surfaces 28a of the cams and over the top end of the short arm of the hooks and so be free of the hooks.

A plow 40 is supported upon the front of the motor vehicle. This plow is supported by a mechanism which is capable of lifting the plow to an inoperative position, or lowering it into a position ready to be used. More specifically, the plow 40 is provided with upper and lower lugs 41 upon its rear face. Upper and lower links 42 are pivotally connected with the lugs 41. The lower links 42 are pivotally connected with the lower ends of vertical stationary links 43. These vertical links 43 are held stationary by braces 44 which are connected with the chassis 10a. The upper links 42 are fixedly mounted upon a rod 45. This rod 45 is supported in bearings 46 mounted on the chassis 10a. A worm 47 is mounted on the rod 45 and meshes with a worm 48 fixed on a vertical rod 49 rotatively supported in bearings 50. The top end of the vertical rod 49 is provided with a wheel 51 by which the rod may be manually turned.

It is pointed out that the plow 40, in conjunction with the links 42 and 43, form a parallelogram construction. This construction permits the plow 40 to be moved substantially vertically when required. This movement may be accomplished by turning the wheel 51 to cause the rod 45 to turn. Turning of the rod 45 moves the arms 42, which in turn correspondingly moves the plow 40. In Fig. 1 the dot and dash lines indicate a raised position of the plow. When required, the plow 40 may be lowered to any desired amount. A feature of providing the vehicle with the plow resides in the fact that because the skip 13 is mounted on the rear of the vehicle, the vehicle will be suitably weighted for plowing heavy loads. Heretofore, great inconvenience has been caused by motor vehicles provided with plows at the front in that it was found that they lacked sufficient momentum and inertia and ground gripping ability to move heavy loads. These deficiencies have now been overcome.

While we have illustrated and described our invention with some degree of particularity, we realize that in practice various alterations therein may be made. We therefore reserve the right and privilege of changing the form of the details of construction or otherwise altering the arrangement of the correlated parts without departing from the spirit or the scope of the appended claims.

Having thus described our invention, what we claim as new and desire to secure by United States Letters Patent is:

1. In a transporting and dumping vehicle, a motor vehicle having a chassis, a frame mounted thereon and having a top rearward projecting arm, a skip for holding earth and other heavy materials and having pegs on the sides slightly forwards and downwards of the center of gravity, cable means guided over said arm and attached to the sides of said skip near the top thereof by which the skip may be hoisted and lowered and be free to swing forwards and rearwards, stationary hooks mounted on said frame and extending along the sides of said skip in the hoisted position thereof for receiving said pegs and having upwardly and rearwardly inclined flanges to guide said pegs over the hooks while the skip is being hoisted, and cams mounted on said hooks and engageable by said pegs due to forward swinging of said skip when the skip is hoisted upwards to be moved forwards away from said hooks so that upon slight lowering of said skip the pegs engage said hooks and when the skip is then slightly raised to move rearwards across said hooks to cam said pegs away from the hooks by swinging the skip rearwards when the skip is then lowered.

2. In a transporting and dumping vehicle, a motor vehicle having a chassis, a frame mounted thereon and having a top rearward projecting arm, a skip for holding earth and other heavy materials and having pegs on the sides slightly forwards and downwards of the center of gravity, cable means guided over said arm and attached to the sides of said skip near the top thereof by which the skip may be hoisted and lowered and be free to swing forwards and rearwards, stationary hooks mounted on said frame and extending along the sides of said skip in the hoisted position thereof for receiving said pegs and having upwardly and rearwardly inclined flanges to guide said pegs over the hooks while the skip is being hoisted, and cams mounted on said hooks and engageable by said pegs due to forward swinging of said skip when the skip is hoisted upwards to be moved forwards away from said hooks so that upon slight lowering of said skip the pegs engage said hooks and when the skip is then slightly raised to move rearwards across said hooks to cam said pegs away from the hooks by swinging the skip rearwards when the skip is then lowered, said cable means including guiding pulleys for the cables swivelly mounted upon said rearward projecting arm and adapted to pivot to maintain the proper alignment of the cables with the pulleys during motion of the cables.

3. In a transporting and dumping vehicle, a motor vehicle having a chassis, a frame mounted thereon and having a top rearward projecting arm, a skip for holding earth and other heavy materials and having pegs on the sides slightly forwards and downwards of the center of gravity, cable means guided over said arm and attached to the sides of said skip near the top thereof by which the skip may be hoisted and lowered and be free to swing forwards and rearwards, stationary hooks mounted on said frame and extending along the sides of said skip in the hoisted position thereof for receiving said pegs and having upwardly and rearwardly inclined flanges to guide said pegs over the hooks while the skip is being hoisted, cams mounted on said hooks and engageable by said pegs due to forward swinging of said skip when the skip is hoisted upwards to be moved forwards away from said hooks so that upon slight lowering of said skip the pegs engage said hooks and when the skip is then slightly raised to move rearwards across said hooks to cam said pegs away from the hooks by swinging the skip rearwards when the skip is then lowered, and a stop member mounted upon said rearward projecting arm and engageable with the front side of the skip for assisting in holding the skip in position.

4. In a transporting and dumping vehicle, a motor vehicle having a chassis, a frame mounted thereon and having a top rearward projecting arm, a skip for holding earth and other heavy materials and having pegs on the sides slightly forwards and downwards of the center of gravity, cable means guided over said arm and attached to the sides of said skip near the top thereof by which the skip may be hoisted and lowered and be free to swing forwards and rearwards, stationary hooks mounted on said frame and extending along the sides of said skip in the hoisted position thereof for receiving said pegs and having upwardly and rearwardly inclined flanges to guide said pegs over the hooks while the skip is being hoisted, cams mounted on said hooks and engageable by said pegs due to forward swinging of said skip when the skip is hoisted upwards to be moved forwards away from said hooks so that upon slight lowering of said skip the pegs engage said hooks and when the skip is then slightly raised to move rearwards across said hooks to cam said pegs away from the hooks by swinging the skip rearwards when the skip is then lowered, and resilient means for urging said cams to a position to extend across the mouths of said hooks.

LAWRENCE GEROSA.
GEORGE P. WAGNER.